Nov. 25, 1969 D. A. VORUM 3,480,512
APPARATUS FOR EDUCING AND RECOVERING OIL FROM OIL-BEARING SOLIDS
Filed Oct. 21, 1965 2 Sheets-Sheet 2

INVENTOR
D. A. VORUM
BY
ATTORNEYS

United States Patent Office

3,480,512
Patented Nov. 25, 1969

3,480,512
APPARATUS FOR EDUCING AND RECOVERING OIL FROM OIL-BEARING SOLIDS
Donald A. Vorum, Madison, N.J., assignor to Phillips Petroleum Company, a corporation of Delaware
Filed Oct. 21, 1965, Ser. No. 499,194
Int. Cl. C10g 7/00; C10b 1/04
U.S. Cl. 196—124
7 Claims

ABSTRACT OF THE DISCLOSURE

A retorting vessel has rotatable grates comprising rotatable jacket tubes which can be provided with means for introducing coolants into the annulus of the jacketed tubes.

---

This invention relates to methods of and apparatus for obtaining oil from oil-bearing solids. In one aspect, this invention relates to methods of and apparatus for retorting oil-bearing materials to produce useful hydrocarbon products. In another aspect, this invention relates to the destructive distillation of hydrocarbonaceous solids such as oil shales, tar sands, coal, lignite, peat, and the like.

The destructive distillation or retorting method of recovering oil from an oil-bearing solid is relatively simple and straight forward. The essential step of this method is the application of heat in an amount sufficient to educe the oil from the oil-bearing solids. The heat necessary to educe the oil from the oil-bearing solids can be obtained from a variety of different sources. One of the better and more popular ways of supplying heat to the oil-bearing solids is to burn a portion of the hydrocarbons contained therein. The heat evolved will serve to educe the oil from the oil-bearing material in the form of a liquid and/or a gaseous hydrocarbon product. This hydrocarbon product can then be collected and removed from the vicinity of the combustion zone by any convenient means.

Although the retorting method of recovering useful hydrocarbons from oil-bearing solid materials is easily understood, the application of this method on a commercial scale has met with a variety of problems. Since the hydrocarbonaceous solids typically contain only about 10 to 20 percent or less of useful hydrocarbons, it is evident that large quantities of the hydrocarbonaceous solids must be handled and heated in order to recover a commercial amount of useful hydrocarbon. Thus, the art of retorting oil-bearing solids has developed with a view toward handling large volumes of solid material in order to make the operation economically successful.

A reasonably good prior art method of retorting an oil-bearing solid involves the steps of continuously passing the solid oil-bearing materials in particulate form downward in a retorting vessel successively through a combustion zone wherein some of the hydrocarbonaceous material is burned to supply the heat necessary to educe oil from the oil-bearing solids, a product removal zone wherein the educt is removed from the descending column of particles, and a cooling zone wherein the residue material is cooled. In the practice of this method, combustion is supported by delivering an oxygen-containing gas to the column of descending particles at a level above the zone of combustion. This is accomplished by means of a plurality of spaced concentric rings or the like arranged in a horizontal plane within the retorting vessel. The rings have a plurality of openings on their bottom surfaces which cause the oxygen-containing gas to pass through the combustion zone to the product removal zone. The product removal zone is also provided with a plurality of concentric rings arranged in a common horizontal plane with a plurality of openings situated to collect the educt passing from the combustion zone. The residue cooling zone includes a plurality of spaced concentric rings arranged in a common plane within the retorting vessel below the product removal zone. Water, which serves as the cooling agent, is introduced through a plurality of openings in the upper surfaces of the rings in the residue cooling zone. As the water leaves these rings, it contacts the hot particles with the result that steam is formed. The steam passes upward through the descending bed of hot particles, thereby serving to cool them.

Although this method of the prior art of recovering hydrocarbons from oil-bearing materials is reasonably effective, it is apparent that the apparatus employed is undesirable in several respects. For example, the three sets of concentric rings used for supplying the oxygen-containing gas, for removing the product, and for supplying the coolant severely restricts the descent of the particles through the retorting vessel. Moreover, the particles can form bridges across a portion of one or more sets of rings thereby completely stopping the flow of particles. Although the size of the oil-bearing particles has been reduced in an effort to overcome this problem, clinkers which are unavoidably formed by the heat fusing the particles together will tend to lodge across the rings, thereby stopping the particle descent completely.

Another popular method of the prior art for recovering useful hydrocarbons from oil-bearing solids is that method practiced by means of the so-called Bureau of Mines Gas Combustion Retort. In this method, the oil-bearing solids gravitate downward in a retort through an air distribution system comprising a plurality of horizontal pipes. The horizontal pipes are used to introduce air for supporting combustion of a fuel gas which passes upward from a lower level in the retort. The fuel gas is heated as it passes through the descending bed of residue material. Combustion occurs when the heated fuel gas contacts the air at a point above the air distribution system. The heat generated serves to educe hydrocarbons from the oil-bearing solids. The educed hydrocarbons in the form of a gas and/or liquid mist pass out through the upper end of the retort whereupon they can be condensed and recovered. A portion of the hydrocarbons can be introduced into the lower part of the retort and used as fuel gas.

This system is undesirable in that the horizontal pipes of the air distribution system interrupt the descent of the particles through the bed. The system also produces vertical channeling of the combustion zone with the net result that it is impossible to maintain an even zone of combustion in the retort. This can cause the pipes to buckle and break due to the uneven heat distribution which results. Further, clinkers which are formed lodge across the pipes thereby contributing to an uneven descent of the particles and an uneven zone of combustion.

According to this invention, these and other disadvantages of the prior art methods and apparatus for recovering hydrocarbons from oil-bearing solids are overcome by means of a novel method and apparatus wherein the overall efficiency is improved primarily because of the uniform and uninterrupted travel of the oil-bearing particles through the several different zones. This is accomplished, as will be more fully hereinafter explained, by means of a retorting apparatus including a generally vertical vessel in the form of a column having inlet means at the top for introducing oil-bearing solids in particulate form and outlet means at the bottom for removing the particulate material in the form of a residue after the hydrocarbons have been educed. The retorting vessel is provided with a first rotatable grate means for introducing an oxygen-containing gas into the vessel to support combustion of the hydrocarbons in the oil-bearing solids and a second rotatable grate means for removing the educed hydrocarbons and the products of combustion. In one embodiment of the invention, the second rotatable grate means comprises a pipe in the form of a tube positioned horizontal across the vessel and spaced beneath the first rotatable grate means. This pipe functions to collect and remove the hydrocarbon educt from within the vessel. In another embodiment of the invention, the second rotatable grate means comprises a horizontal pipe in the form of a tube positioned across the vessel and spaced below the first rotatable grate means and a second pipe in the form of a tube positioned above and spaced from the first rotatable grate means. In this embodiment of the invention, the first and second pipes serve to remove the hydrocarbon educt from above and below the zone of combustion. A third rotatable grate means positioned horizontally within and near the bottom of the vessel serves to introduce a coolant into the vessel for the purpose of lowering the temperature of the residue particles. The coolant passes upward in the vessel to the second rotatable grate means whereupon it is removed with the hydrocarbon educt. This path of the coolant through the lower portion of the vessel will tend to scrub any remaining hydrocarbon educt from the residue particles, thereby increasing the over-all efficiency of the method.

The third rotatable grate means can also be used to pass steam or air through the descending mass of hot residue particles. Since the residue particles will contain a certain quantity of carbonaceous material, a reaction between the steam and the carbon of the carbonaceous material will produce a combustible gas which will add to the total fuel gas produced. This reaction product will travel upward in the retort to the combustion zone.

The rotatable grates of this invention can also be used to supply the combustion air in the so-called Bureau of Mines Gas Combustion Retort. In this environment, the rotatable grates provide an even descent of particles through the retort and a grinding up of the clinkers which form. This prevents channeling of the combustion zone thus providing a more even distribution of heat. When the rotatable grates are provided with cooling means, as will be more fully hereinafter described, their life is much longer because they are better able to withstand the heat in the gas combustion retort.

The first, second, and third rotatable grate means of this invention each comprises at least one tube having at least one opening therein for removing or introducing a fluid into the vessel. In one embodiment of the invention, each of the first, the second, and the third rotatable grate means comprises a plurality of tubes arranged and mounted for rotation in a substantially common, substantially horizontal plane. In another embodiment of the invention, each of the tubes in each of the first, second, and third rotatable grate means is provided with a plurality of openings through which fluid can be introduced into or withdrawn from the vessel. In still another embodiment of the invention, each of the tubes in the first, second, and third rotatable grate means is provided with a jacket spaced from the tube to form an annulus through which a coolant can be circulated. In the latter embodiment of the invention, a fluid conducting means in the form of a tubular-shaped pipe is attached in fluid communication with the opening in each of the tubes and the exterior surface of each of the jackets for the purpose of allowing fluid to be passed between the interior of each of the tubes and the vessel.

When the first, second, and third rotatable grate means of this invention are rotated as the oil-bearing particles pass downward successively through the different zones in the vessel, a more even zone of combustion is established and a more uniform descent of the oil-bearing particles is obtained. This increases the over-all efficiency of the method because the useful hydrocarbons are more completely educed and recovered. Another important advantage realized with the rotatable grate means of this invention is that the clinkers formed by fusion of the particles do not hinder or interrupt the normal descent through the vessel because of the agitation and grinding effect obtained by the rotating grates. This improved result increases the quantity of hydrocarbon recovered because it increases the capacity of there torting vessel to an extent which makes the refinement of oil-bearing solids more attractive commercially.

The improved results and advantages obtained with the rotatable grates of this invention can be realized when the grates are used as the first, second, and third rotatable grate means described in connection with the generally vertical vessel in the form of a column or when the rotatable grates are used as the air distribution system in the Bureau of Mines apparatus.

Accordingly, it is an object of this invention to provide an improved method of and apparatus for educing and recovering hydrocarbons from oil-bearing solids.

Another object of this invention is to provide a retorting apparatus and method of educing hydrocarbons from oil-bearing solids which are more efficient than the retorting apparatus and methods of the prior art.

A further object of this invention is to provide a method and apparatus for educing and recovering hydrocarbons from oil-bearing materials wherein the oil-bearing particles move downward through the apparatus at a more constant rate such that a more uniform zone of combustion is achieved.

Another object of this invention is to provide a method and apparatus which will prevent channeling of the combustion zone in the oil-bearing particles of a retorting system.

Still another object of this invention is to provide rotatable grate means for introducing an oxygen-containing gas into the combustion zone of a retorting vessel or the like, for removing educed hydrocarbons from a retorting vessel or the like, and for supplying coolant to a retorting vessel or the like.

These and other objects of the invention will become apparent to one skilled in the art after studying the following detailed description, the appended claims, and the accompanying drawing in which:

Figure 1:
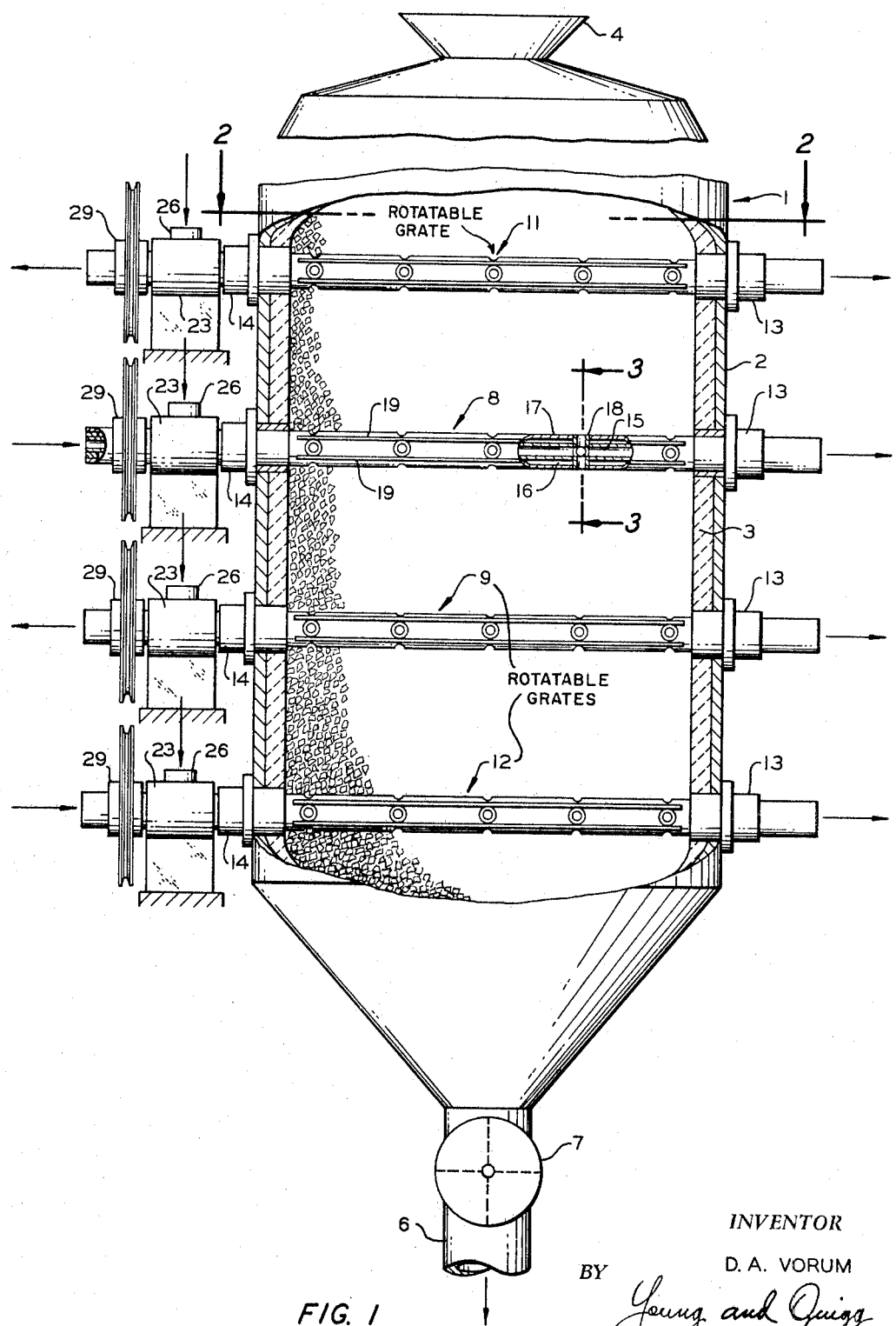
FIGURE 1 is a schematic elevation partially in section representing a retorting vessel in accordance with the invention.

Referring now to the drawings, wherein like reference numerals are used to denote like elements, and particularly to FIGURE 1, a retorting vessel shown generally by reference numeral 1 comprises a metal shell 2 having a refractory lining 3. The retorting vessel 1 is preferably situated in a generally vertical position with a height-to-diameter ratio of at least 1. It is preferred that the length or height of the retorting vessel be many times its diameter in order to conserve energy requirements for heating the vessel and for removing the product.

A hopper 4 of any suitable construction is attached to the top of the retorting vessel 1 in a manner which will allow a continuous feed of oil-bearing solid particles. The bottom of the retorting vessel 1 terminates in the form of a centrally positioned conduit 6 having a suitable valve means 7 such as a star-type valve or the like. It is generally preferred that the upper portion of retorting vessel 1 be of cylindrical shape with the walls diverging outwardly in a downward direction and that the lower portion be in the shape of a cone which converges into conduit 6. This type of construction reduces the tendency of the particles to bridge within the vessel as they descend. The rate of descent of the oil-bearing solids through the vessel can be controlled by regulating the position of valve 7, as will be more fully hereinafter described.

The apparatus of this invention comprises, in combination, a first rotatable grate means for introducing an oxygen-containing gas into the descending particles of oil-bearing solids for the purpose of supporting combustion of a portion of the oil in the oil-bearing solids, a second rotatable grate means for collecting and removing the hydrocarbon educt from within the vessel, and a third rotatable grate means for introducing a coolant into the vessel to lower the temperature of the residue particles. Although the attached drawings illustrated a plurality of tubular members in each of the first, second and third rotatable grate means, each of the grate means can be a single tubular member having a single opening such as a longitudinal slit or the like therein.

The grates of this invention are mounted for rotation within the retorting vessel 1 and comprise a first rotatable grate means shown generally by reference numeral 8; a second rotatable grate means including a first pipe shown generally by reference numeral 9 situated below the first rotatable grate means and a second pipe shown generally by reference numeral 11 and situated above the first rotatable grate means; and a third rotatable grate means shown generally by reference numeral 12 situated below the second rotatable grate means. As previously indicated and described in connection with one embodiment of the invention, the second pipe shown generally by reference numeral 11 of the second rotatable grate means can be eliminated if desired. The first rotatable grate means 8, the second rotatable grate means including pipes 9 and 11, and the third rotatable grate means 12 are each mounted generally horizontal and are carried by the walls of the retorting vessel by means of a plurality of bearing sleeves 13 and 14. The bearing sleeves 13 and 14 serve to allow the rotatable grate means to be rotated in accordance with the invention.

Figure 2:
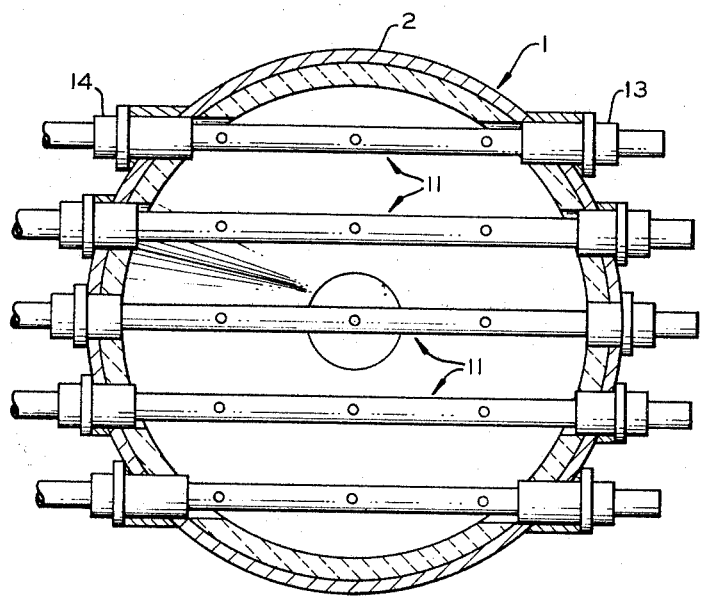
FIGURE 2 is a cross-section along the lines 2—2 of FIGURE 1.
Figure 3:
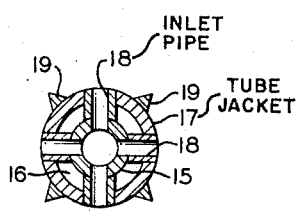
FIGURE 3 is a cross-section of the rotatable grate means along the line 3—3 of FIGURE 1.
Figure 4:
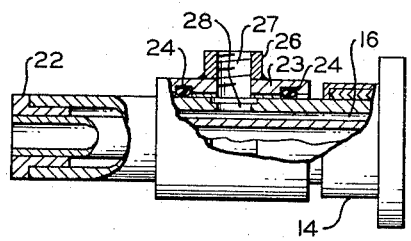
FIGURE 4 is a detail view of the mounting for the rotatable grate means partially in section.
Figure 5:
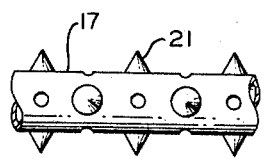
FIGURE 5 is an elevation view of a rotatable grate means showing another embodiment of the invention.

Although it is within the spirit and scope of this invention to employ a single tubular member having a single opening therein in each of the rotatable grate means, it is preferred that each of the rotatable grate means comprise a plurality of rotatable grates each having a plurality of openings. It is further preferred that the rotatable grates in each of said pluralities be arranged in a substantially common, substantially horizontal plan. As illustrated by FIGURE 2 of the drawings, a plurality of pipes or tubular members 11 is mounted in a substantially common, substantially horizontal plane. As previously indicated, this type of construction is generally preferred because it provides more complete and uniform agitation of the descending particles of oil-bearing solids.

As illustrated in the drawings, each of the rotatable grates in the first, second and third rotatable grate means comprises a tube 15 having a jacket 17 spaced therefrom to form an annulus 16. Fluid conducting means for allowing fluid communication between the interior of tubes 15 and the inside of the retorting vessel comprises a plurality of radial placed tubular-shaped pipes 18. Each of the tubular-shaped pipes 18 is positioned normal to the surface of the tube 15 and the jacket 17 in a manner which will allow fluid to be passed through pipe 18 in a direction normal to the surface of jacket 17. Thus, the pipes 18 in the first and third rotatable grate means will serve to allow an oxygen-containing gas and a coolant, respectively, to be introduced into the vessel. The tubular-shaped pipes 18 in the second rotatable grate means, including pipes 9 and 11, will serve to collect and transmit the educed hydrocarbons.

In a modification of the invention, each of the rotatable grates is provided with a rib 19 extending longitudinally with the jacket 17. The rib 19 can be attached to the jacket as by welding or the like. In still another modification of the invention, each of the rotatable grates is provided with a plurality of spaced spikes 21 attached to the outer surface of the jacket 17. It is generally preferred that the rotatable grates include one of these modifications because the presence of the ribs 19 or the spikes 21 assists in agitating and grinding the particles as they descend through the retorting vessel. This result not only inhibits the formation of clinkers but also exposes more surface area on the particles, thereby promoting the eduction of the hydrocarbons.

Each of the rotatable grates in the first, second and third rotatable grate means is provided with a flange 22 at its free end which serves to connect and seal the tube 15 and the sleeve 17. Suitable fluid coupling means 23 connected to each of the sleeves 17 in the first and third rotatable grate means can be used to introduce an oxygen-containing gas and coolant, respectively, into the retorting vessel. A suitable fluid coupling means 23 attached to the sleeve 22 in the second rotatable grate means can be used for removing the hydrocarbon educt from within the vessel.

Each of the fluid couplers 23 is provided with a pair of O-rings 24 of elastomeric material or the like which serves to form a seal between the fluid coupler 23 and the exterior surface of shaft 17. Each of the fluid couplers 23 is provided with a flange 26 having an opening 27 in registry with a plurality of circumferentially-spaced openings 28 in sleeve 17. This arrangement will allow a coolant such as water or the like to be introduced into the annulus 16 and circulated through the rotatable grates to prevent them from becoming too hot as a result of the retorting operation. The coolant can be allowed to issue from the annulus at the opposite ends of the rotatable grates as indicated by the arrows or another fluid coupler can be attached to the opposite ends of the rotatable grates and the coolant fluid recovered.

A pulley 29 attached to each of the rotatable grates through each of the outer sleeves 17 can be connected to a suitable prime mover (not shown) by means of a belt. It is within the scope of the invention to employ any suitable motive means for rotating the rotatable grates. It is also within the spirit and scope of this invention to oscillate each of the rotatable grates by rotating them through an angle, for example, of 90 or 180 degrees.

In the practice of this invention, oil shale or the like in a particle size of about ½ to about 2 inches can be charged into the retorting vessel 1 by gravity flow from hopper 4. The oil shale particles can be as large as 4½ inches or more if desired. The star valve 7 is stationary at the start of the retorting operation. The hopper 4 is provided with an additional supply of oil-bearing shale particles so that once the rotation of star valve 7 begins, a continued supply of oil shale is available and the descent of the particles will be uninterrupted in the vessel.

The retorting or destructive distillation operation can be initiated by igniting the hydrocarbons present in a horizontal zone extending across the vessel in the vicinity of the rotatable grate means 8. This can be accomplished by injecting a mixture of a combustible gas and air through tube 15 and tubular pipes 18 in the rotatable grate means 8. This mixture of air and combustible gas can be burned within the vessel for a sufficient length of time to heat the oil-bearing particles to a temperature above their ignition or kindling point. After the hydrocarbons in the oil-bearing solids ignite, the supply of combustible gas can be stopped and the supply of air maintained through the rotatable grate means 8 in order to support and continue the combustion. Other techniques can be employed for initiating combustion. For example, the combustion process can be started by temporarily positioning an air-gas burner within the vessel in the approximate vicinity of the rotatable grate means 8. After the combustion process is proceeding with the fuel obtained from the hydrocarbons in the oil-bearing solids, the air-gas burner can be removed from this side of the vessel so as not to interfere with the continuous descent of the particles.

In the destructive distillation of an oil-bearing solid such as oil shale or the like, the rotatable grate means indicated generally by reference numeral 8 is employed for introducing an oxygen-containing gas into the vessel in an amount sufficient to support combustion of the hydrocarbons for the purpose of obtaining heat in an amount sufficient to educe the hydrocarbons from the oil-bearing solids. The second rotatable grate means including pipes 9 and 11 is employed for removing the liquid and vapor hydrocarbon educt and the products of combustion. As previously indicated, the upper pipe 11 of the second rotatable grate means can be eliminated if desired. Thus, the second rotatable grate means can be pipes 9 and 11 or pipe 9 alone. The third rotatable grate means 12 is employed for supplying a cooling medium such as water in a uniform manner to the lower portion of the retorting vessel. The introduction of water in this manner generally is advantageous because the residue material can be more easily handled after it has been cooled. Moreover, when water is used as the cooling medium in this manner, the steam generated when the water contacts the hot residue solids is helpful in forming a seal against product leakage through star valve 7. Since the steam generated is removed from the vessel by means of pipe 9 of the second rotatable grate means, it serves to strip or wash the desending residue particles of residual educt as it travels upward through the descending particles. Moreover, as hereinbefore indicated, the steam can react with the carbon in the carbonaceous residue material to produce additional fuel gas.

The heat generated in the combustion zone is sufficient to educe the hydrocarbons from the oil-bearing solids in the form of vapors and liquids. The actual distribution of product between the vapor and liquid states depends at least in part on the temperature level maintained within the combustion zone. The products are forced from the combustion zone and passed upwardly to pipe 11 and downwardly to pipe 9 as a result of the oxygen-containing gas issuing from the first rotatable grate means 8 as it rotates. The liquid and vapor oil products are collected by the second rotatable grate means including pipes 9 and 11 and the tubular pipes 18. These products including the gaseous products of combustion and steam which is rising from the third rotatable grate means 12 can be removed from the retorting vessel to a suitable storage area. If desired, a slight vacuum of about 100 to 300 millimeters of mercury may be placed on the pipes 9 and 11 of the second rotatable grate means to facilitate removal of the educed products, the products of combustion, and the steam.

It is to be noted that by providing rotatable grates in either the column system or in the Bureau of Mines system, in accordance with this invention, the problem of channeling of the combustion zone is substantially overcome. This undesirable condition arises when the fuel gas follows channels in the bed of particles. Since the channels are probably created by the unequal distribution of the oil-bearing particles and/or the fusion of the particles which then block an area, the rotatable grates agitate the bed and disintegrate the clinkers to provide even flow through the bed. Although all of the rotatable grate means are illustrated as having a jacket which forms an annulus with the tubular member for the purpose of passing a coolant therethrough, it is within the spirit and scope of this invention to eliminate the jacket and the cooling feature from the rotatable grate means. This is especially true insofar as the third rotatable grate means 12 is concerned because the water which is sprayed into the vessel will serve as a coolant for that grate.

Although the invention is described particularly with reference to the column type of retorting vessel, as previously indicated the invention has application to any retorting operation including the so-called Bureau of Mines system.

Although the invention has been described in considerable detail, it must be understood that such detail is for that purpose only and many variations and modifications can be made by one skilled in the art without departing from the spirit and scope of the invention.

I claim:

1. In an apparatus for recovering oil from oil-bearing solids including a retorting vessel having inlet means at the top for passing oil-bearing solids into said vessel and outlet means at the bottom for withdrawing residue material from said vessel, the improvement comprising first rotatable grate means positioned within said vessel and carried by the walls thereof for introducing an oxygen-containing gas into said vessel to support combustion of the oil in said oil-bearing solids; second rotatable grate means positioned within said vessel and carried by the walls thereof for removing products from said vessel; and third rotatable grate means positioned within said vessel below said second rotatable grate means and carried by the walls of said vessel for introducing a coolant into said vessel.

2. An apparatus according to claim 1 wherein said second rotatable grate means includes a first pipe positioned below said first rotatable grate means, said first pipe having an aperture through which said products can pass, and a second pipe positioned above said first rotatable grate means, said second pipe having an aperture through which said products can pass.

3. An apparatus according to claim 1 wherein said first, said second and said third rotatable grate means each comprise a tube; a jacket surrounding said tube and spaced therefrom to form an annulus with said tube through which a fluid can be passed to cool said tube; means connected to said jacket for allowing fluid to be passed through said annulus to cool said tube and said jacket; and fluid conducting means connecting the interior of said tube with the exterior of said jacket for allowing fluid communication between the interior of said tube and the interior of said vessel.

4. An apparatus according to claim 3 wherein the exterior surface of said jacket in each of said first, said second, and said third rotatable grate means is provided with a rib extending longitudinally of said jacket.

5. An apparatus according to claim 3 wherein the exterior surface of said jacket in each of said first, said second, and said third rotatable grate means is provided with a plurality of teeth projecting outward from said jacket.

6. In an apparatus for recovering oil from oil-bearing solids including a generally vertical retorting vessel having inlet means at the top for passing oil-bearing solids into said vessel and outlet means at the bottom for withdrawing residue material from said vessel, the improvement comprising, in combination, first rotatable grate means in said vessel for introducing an oxygen-containing gas into said vessel to support combustion of the oil in said oil-bearing solids; second rotatable grate means in said vessel for removing products therefrom; third rotatable grate means positioned in said vessel below said second rotatable grate means for introducing a coolant into said vessel; each of said first, said second, and said third rotatable grate means comprising a plurality of tubes carried by the walls of said vessel and arranged in a substantially common, substantially horizontal plane; a plurality of jackets, corresponding in number to the number of said tubes, each of which surround each of said tubes and each of which is spaced from each of said tubes to form an annulus through which fluid can be passed to cool each of said tubes; means connected to said jacket to allow fluid to be passed through said annulus to cool said tubes and said jackets; and fluid conducting means connecting the interior of each of said tubes with the exterior of each of said corresponding jackets for allowing fluid communication between the interior of each of said tubes and the interior of said vessel.

7. In an apparatus for recovering oil from oil-bearing solids including a retorting vessel having inlet means at the top for passing oil-bearing solids into said vessel and outlet means at the bottom for withdrawing residue material from said vessel, the improvement comprising rotatable grate means carried by the walls of said vessel for introducing air into said vessel to support combustion therein, wherein said rotatable grate means includes a plurality of tubes carried by the walls of said vessel and arranged in a substantially common, substantially horizontal plane; a plurality of jackets, corresponding in number to the number of said tubes, each of which surround each of said tubes and each of which is spaced from each of said tubes to from an annulus through which fluid can be passed to cool each of said tubes; means connected to said jacket to allow fluid to be passed through said annulus to cool said tubes and said jackets; and fluid conducting means conecting the interior of each of said tubes with the exterior of each of said corresponding jackets for allowing fluid communication between the interior of each of said tubes and the interior of said vessel.

References Cited

UNITED STATES PATENTS

| | | | |
|---|---|---|---|
| 167,571 | 9/1875 | Schmitz | 110—74 |
| 1,113,962 | 10/1914 | Dern et al. | 126—181 |
| 1,595,425 | 8/1926 | Sauvageot | 110—74 |
| 1,668,820 | 5/1928 | Rhoades | 202—93 |

NORMAN YUDKOFF, Primary Examiner

D. EDWARDS, Assistant Examiner

U.S. Cl. X.R.

196—126; 202—117, 121, 265; 208—11